Patented Jan. 4, 1949

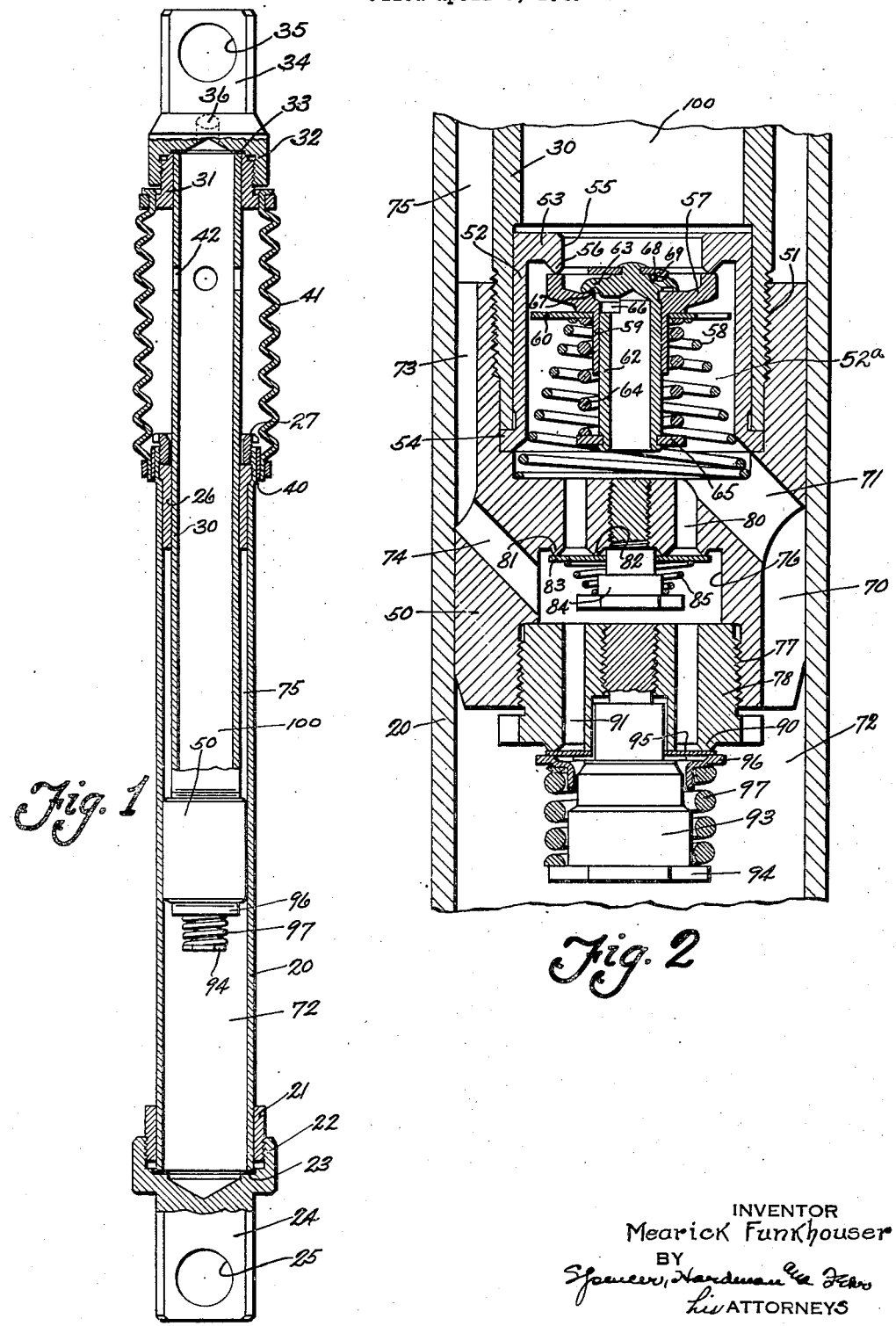

2,458,157

UNITED STATES PATENT OFFICE 2,458,157

SHOCK ABSORBER

Mearick Funkhouser, Dayton, Ohio, assignor to General Motors Corporation, Detroit, Mich., a corporation of Delaware Application April 3, 1946, Serial No. 659,335

10 Claims. (Cl. 188—88)

1

This invention relates to improvements in hydraulic shock absorbers particularly of the direct acting type.

It is among the objects of the present invention to provide a direct acting, hydraulic shock absorbed of simple and compact design capable of controlling both the approaching and separating movements of two relatively movable members, and in which one of said members is entirely devoid of any fluid flow control mechanism.

Compactness in the design of the shock absorber of the present invention is attained by utilizing the piston rod for the provision of the fluid reservoir and by providing a piston on said rod which carries all of the fluid flow control devices of the shock absorber.

Further objects and advantages of the present invention will be apparent from the following description reference being had to the accompanying drawings wherein a preferred embodiment of the present invention is clearly shown.

In the drawings:

Fig. 1 is a longitudinal, sectional view of a shock absorber.

Fig. 2 is an enlarged fragmentary sectional view showing the construction of the shock absorber piston.

Referring to the drawings, the numeral 20 designates the cylinder of the hydraulic shock absorber. A collar 21 is secured around said cylinder at its one end in any suitable manner such as welding or the like, this collar being exteriorly threaded to receive the threaded recess of a closure member 22. A gasket 23 is placed between the closure member and the end surface of the cylinder 20 to prevent fluid leaks at this end of the cylinder. The closure member 22 has an extending lug 24 provided with an opening 25, this lug forming a mounting member. By means of this, one end of the shock absorber may be attached to one of the relatively movable members whose movements the shock absorber is intended to control.

At the opposite end of the cylinder 20, bearing sleeve 26 fits within, this bearing sleeve being maintained in position by a collar 27 threadedly received by the cylinder 20. Bearing sleeve 26 slidably supports a tube which forms the piston rod 30. Said rod extends into the cylinder and is provided with exterior threads for threadedly engaging the piston 50. The other end of the piston rod 30 extends outside the cylinder 20 and has a flanged collar 31 secured about it in any suitable manner. Exterior threads on the collar 31 receive the threaded recess of a closure

2 member 32, a seating gasket 33 being provided between said closure member and of the tubular piston rod 30 to prevent fluid leaks at this point. Like closure member 22, this closure member 33 has a lug 34 extending therefrom provided with an opening 35. This lug forms a mounting member for this end of the shock absorber by means of which it may be attached to the other of the relatively movable members whose movement the shock absorber is adapted to control. An opening 36 in the closure member 32 provides communication between the interior of the tubular piston rod 30 and atmosphere.

A collar 40 is secured about the cylinder 20 adjacent its upper end and to this collar 40 is attached one end of a collapsible and expandable fluid tight bellows 41 so that a leak-proof joint is provided between the end of the bellows and the collar 40 to which it is attached. The other end of this bellows 41 is attached to the flange of collar 31 so as to provide a leak-proof connection therewith and so as to be movable with said flange as the piston rod 30 is reciprocated. Orifices 42 in the tubular piston rod 30 adjacent the end thereof attached to the closure member 32 provide communication between the interior of the bellows 41 and the interior of the tubular piston rod 30.

The Fig. 2 in the drawings is an enlarged fragmentary sectional view illustrating in detail the construction of the piston 50 attached to the tubular piston rod 30. This piston slidably engages the inner wall of the cylinder 20. Its ends are each recessed and a plurality of fluid passages are provided in the piston for the transfer of fluid from one side of the piston to the other. The recess at the one or upper end of the piston is interiorly threaded as at 51 for receiving the threaded end of the tubular piston rod 30. A valve cage 52 in the form of a cylinder having an inwardly extending flange 53 at its outer end and an outwardly extending flange 54 at its inner end fits within a counterbored portion at the end of the tubular piston rod 30, the outwardly extending flange 54 being clamped between the bottom surface of the recess in piston 50 and the end of the tubular piston rod 30 and thereby is rigidly held in position. This valve-cage 52 forms what may be termed a "fluid receiving chamber" 52a in the piston. The inwardly extending flange 53 of the cage 52 is annular in shape and thus provides a central opening or port 55 which provides communication between the fluid receiving chamber and the interior of the tube 30 and is surrounded by an annular ridge 56 extending downwardly toward the bottom of the valve cage and forms an annular valve seat against which the fluid intake valve 57 is urged by a spring 58 interposed between said valve 57 and the bottom of the recess in piston 50. This valve 57 has a tubular body portion 59 surrounded by a perforated washer 60 which holds the valve central of the cage and thereby assures engagement of the valve with the annular seat 56. The cylindrical body portion 59 of valve 57 slidably supports the tubular stem portion of valve 62, the one end of which has an enlarged head portion 63 normally engaging the valve 57 due to the provision of a spring 64, which is interposed between the washer 60 and another washer 65 secured to the outer end of the valve 62. An orifice 66 in the one side of the stem portion of the valve 62 provides communication between the interior of the said valve and an annular groove 67 formed in the under surface of the head 63 adjacent valve 57. This annular groove 67 communicates with a space 68 beneath a cover plate 69 secured to the outer end of the valve in any suitable manner. The spring 58 is of much lighter construction than the spring 64 and thus valve 57 is urged against its seat 56 with substantially less pressure than the valve 62 or more particularly its head portion 63 against the valve 67 by the spring 64. Therefore a lesser fluid pressure will move valve 57 from engagement with its seat than is necessary to move valve head 63 from engagement with valve 67 to establish a fluid flow through the valve 62.

A channel 70 in the side of the piston for a portion of its length communicates with a duct 71 which leads into the fluid receiving chamber 52a formed by the valve cage 52. Channel 70 terminates in the lower end of the piston 50 and opens into the lower working chamber 72 of the cylinder.

Another channel 73 in the side wall of the piston 50, extending from its top end, longitudinally for a portion of the piston length, connects with a passage 74 which communicates with the recess 76 in the lower end of the piston. Thus channel 73 and passage 74 connect the upper working chamber 75, an annular space between the inner and outer walls of the cylinder 20 and piston rod 30, with said lower recess 76. A counterbored portion of recess 76 is interiorly threaded as at 77 for receiving a plug 78.

A series of passages 80, arranged in a circular row in the piston 50, provide communication between fluid receiving chamber 52a and the recess 76. Two spaced concentric, annular ridges 81 and 82 extend from the end wall of recess 76. The passages 80 terminate in the space between these two ridges 81 and 82 which form annular seats for the valve 83. A stud 84 is centrally threaded in the piston portion between the two recesses in the piston, said stud having an enlarged head portion against which one end of spring 85 abuts, the other end of the spring engaging valve 83 yieldably to urge it upon the seats or ridges 81 and 82 thereby closing passages 80 from communication with recess 76.

The outer end of plug 78 extending from the piston into the lower cylinder chamber 72 has an annular ridge 90 extending therefrom. A plurality of passages 91 in plug 78 terminate in the outer end of the plug within the confines of the annular ridge 90 and communicate with the recess 76 in which valve 83 is situated. A threaded central opening in the plug 78 receives the threaded shank of a stud 93 which has an enlarged head 94. A resilient disc valve 95 in the form of a ring, fits about the shank of stud 93 and is tightly clamped thereby against the end surface of plug 78 so that said valve normally engages the annular ridge 90 and thereby closes passages 91 from communication with the lower cylinder chamber 72. An abutment collar 96 with a tubular body portion slidably fitting upon stud 93 and an outwardly extending, annular flange engaging the disc valve 95 is engaged by one end of a spring 97 the other end of said spring seating on the stud head 94. This spring 97 acting through collar 96 urges valve 95 upon its seat, the annular ridge 90, at a predetermined pressure.

As has been stated, the present shock absorber is adapted to control both the approaching and separating movements of two relatively movable members as, for instance, the frame and axle of a vehicle. The member 34, to which the piston rod 30 and its piston 50 is attached, may be anchored to the frame of the vehicle while member 24, to which the cylinder 20 is attached, may be anchored to the vehicle axle.

When the two relatively movable members 24 and 34 are moved toward each other the piston rod 30 and its piston 50 are thrust into the cylinder 20, the piston thereby exerting a pressure upon the fluid in the lower chamber 72. As a result fluid will be found through the piston channel 70, duct 71 and into the chamber defined by the valve cage 53 which is closed by the mechanism including valves 57 and 62. The passages 80 leading from this chamber are normally closed by valve 83. Valves 62 and 83 are the only ones operative to establish a fluid flow from within the valve cage 53 and inasmuch as the spring 85 urging valve 83 closed is weaker than spring 64 urging valve 62 closed, valve 83 will be the first to yield to fluid pressure and establish a fluid flow in response to fluid pressure in the said valve cage chamber. With valve 83 off its seat fluid may now flow through passages 80 into the chamber of recess 76 thence through duct 74 channel 73 into the upper cylinder chamber 75. Chamber 75 is an annular chamber between piston rod 30 and the cylinder 20 and therefore is of smaller cubical content than the lower cylinder chamber 72. Therefore all of the fluid displaced by the piston from the larger chamber 72 cannot be received by the upper, smaller cylinder chamber 75. That portion of the fluid displaced by the piston rod in the upper cylinder causes valve 62 to be moved against the effect of spring 64 and thus the fluid displaced from chamber 72 and not received by chamber 75 flows through valve 62, its side orifice 66 and past the annular edge of head 63 which is now lifted from engagement with valve 62. From valve 62 the fluid flow continues through the opening 55 in the valve cage into the interior of the piston rod 30 which is hollow to provide a fluid reservoir 100.

To actuate valve 62 against the effect of its spring 64 so that the head 63 is lifted from engagement with its seat on the now stationary valve 57, a predetermined fluid pressure must exist in the valve cage 53. When this is effected, the restriction to fluid flow established by the annular space between the head 63 and valve 57, will cause the shock absorber to resist the approaching movements of the two relatively movable members between which it is mounted.

When members 34 and 24 are moved apart due to the separating movement of the two relatively movable members between which they may be connected, the piston rod and its piston 50 is moved from the closed end of the cylinder toward the sleeve bearing 26 which forms the head of the upper working chamber 75 of the cylinder. Now the piston 50 exerts a pressure upon the fluid in the annular cylinder chamber 75; and in response thereto fluid is forced through the piston channel 73, passage 74 into the space in recess 76 between plug 78 and valve 83. The fluid pressure through passages 91 in plug 78 upon valve 95 will, when attaining a predetermined value, move said valve 95 from its seat 90 against the effect of spring 97 thereby establishing a restricted fluid flow from the upper to the lower cylinder chamber.

Fluid from the smaller, upper cylinder chamber will not completely satisfy the fluid demand of the lower chamber as the piston moves toward the sleeve bearing 26 and thereby creates a subatmospheric pressure in said lower chamber. Thus fluid in the interior of the piston rod or more particularly the fluid reservoir will urge valve 57 from its annular seat 56 against which it is normally urged by the comparatively light spring 58. Now fluid may flow substantially freely from the reservoir 100 through opening 55 in the valve cage 53, past valve 57 and then through the valve cage, passage 71, groove 70 in the piston into the lower cylinder chamber, thereby compensating for the insufficient amount of fluid receivable from the smaller upper cylinder chamber 75.

The fluid in the reservoir 100 within the piston rod 30 is at atmospheric pressure inasmuch as duct 36 in member 32 connects the reservoir with atmosphere at all times. Fluid in the reservoir may also rise to openings 42 in which case it will spill over into the bellows element 41 which is tightly secured to both the cylinder and piston rod, in the latter instance by the collar 31.

From the aforegoing it may be seen that applicant has provided a sturdy and compact single acting shock absorber in which one element serves both as a piston rod and a fluid reservoir and in which the piston carries all valves necessary to control fluid flow so that the shock absorber provides the desired resistance to control both the separating and approaching movements of the two relatively movable members to which said shock absorber is attached.

While the embodiments of the present invention as herein disclosed, constitutes a preferred form, it is to be understood that other forms might be adopted, all coming within the scope of the claims which follow.

What is claimed is as follows:

1. An hydraulic shock absorber comprising a fluid containing cylinder having a closed and an open end and a bearing bushing in its open end; a piston in the cylinder having fluid passages and forming upper and lower working chambers in the cylinder; a tube slidably supported in the bearing bushing and having its one end attached to the piston; a valve cage in the tube and held between the tube and piston said valve-cage providing a fluid receiving chamber in the piston and having an annular valve-seat extending into the fluid receiving chamber; a valve yieldably urged against the annular valve-seat and movable to establish a fluid flow from the tube through the fluid receiving chamber and into the lower working chamber; said valve having a tubular extension; a valve slidably supported in the tubular extension of the first mentioned valve and movable relatively thereto to establish a fluid flow from the lower working chamber through the fluid receiving chamber and into the tube; a valve yieldably urged against the piston and movable relative thereto to open certain piston passages for establishing a fluid flow from the lower working chamber through the fluid receiving chamber into the upper working chamber; and another valve normally urged to close certain fluid passages in the piston and operable by fluid pressure from the upper working chamber to establish a flow into the lower working chamber.

2. An hydraulic shock absorber comprising a closed, fluid filled cylinder; a recessed piston in said cylinder; a valve-cage in said piston forming a fluid receiving chamber therein; a hollow piston rod extending through one end of the cylinder and into the recess of the piston to secure the valve cage therein the interior of the rod being in communication with the fluid receiving chamber and with fluid flow passages in the piston; and a plurality of fluid flow control devices in the piston, two of which are rendered effective to establish fluid flows in response to movement of the piston in one direction, the one of these two establishing a substantially unrestricted flow from the pressure side of the piston, through the fluid receiving chamber to the opposite side of the piston, the other a restricted flow from said pressure side of the piston through the fluid receiving chamber and into the hollow piston rod, two other of said plurality of fluid flow control devices being rendered effective to establish fluid flow in response to operation of the piston in the opposite direction, the first of these two other devices establishing a substantially unrestricted fluid flow from the hollow tube through the fluid receiving chamber into the cylinder chamber at the opposite side of the piston and the second of these two other devices establishing a restricted fluid flow from the cylinder chamber around the piston rod to the cylinder chamber on the opposite side of the piston and independently of the fluid receiving chamber.

3. An hydraulic shock absorber comprising, a cylinder closed at one end and having a bearing sleeve secured therein at its other end, said cylinder being filled with a fluid; a tube slidably supported by the bearing sleeve and extending into the cylinder; a piston in the cylinder secured to the inner end of the tube said piston having fluid passages; a closure member secured to the outer end of the tube; a collapsible and extendible liquid tight sleeve having one end sealingly secured to and about the cylinder and its other end to the closure member of the tube, the inside of said sleeve being in communication with the interior of the tube by openings in the tube more adjacent its outer end; a duct in the closure member of the tube connecting the extreme outer end of the tube interior with atmosphere; valves in the piston controlling the flow of fluid between the cylinder chamber on each side of the piston and between said chambers and the interior of the tube in response to reciprocation of the piston in said cylinder; and mounting blocks provided by the closure members of both the cylinder and tube.

4. A hydraulic shock absorber comprising a fluid containing cylinder closed at one end and having a bearing sleeve at its other end; a tube slidably extending through said bearing sleeve into the cylinder; a piston in the cylinder, attached to the tube and forming cylinder working chambers on each side of the piston, said piston having a fluid receiving chamber with three separate ports, one port communicating with the tube, the other two each with a working chamber respectively; and valve mechanisms normally closing the ports communicating with the tube and with the one cylinder chamber, the port communicating with the other cylinder chamber being constantly open, the valve mechanism controlling the port to said one cylinder chamber being operative to open its port in response to a lower fluid pressure than the valve controlling the port to the tube as the piston is moved toward the closed end of the cylinder.

5. A hydraulic shock absorber comprising a fluid containing cylinder closed at one end and having a bearing sleeve at its other end; a tube slidably extending through said bearing sleeve into the cylinder; a piston in the cylinder, attached to the tube and forming cylinder working chambers on each side of the piston, said piston having a fluid receiving chamber with three separate ports, one port communicating with the tube, the other two each with a working chamber respectively; a valve normally closing the port between the receiving chamber and tube; another valve normally closing the port between said chamber and the cylinder working chamber through which said tube extends, said other valve being operative to open its port in response to a lower fluid pressure in the receiving chamber than said first mentioned valve.

6. A hydraulic shock absorber comprising a fluid containing cylinder closed at one end and having a bearing sleeve at its other end; a tube slidably extending through said bearing sleeve into the cylinder; a piston in the cylinder, attached to the tube and forming cylinder working chambers on each side of the piston, said piston having a fluid receiving chamber with three separate ports, one port communicating with the tube, the other two each with a working chamber respectively; a compound valve mechanism normally closing the port between the receiving chamber and tube, said valve mechanism being operative to establish a substantially free flow of fluid from the tube into said chamber as the piston moves in one direction and a restricted flow of fluid from the said receiving chamber into the tube as the piston moves in the opposite direction; and a valve normally closing the port leading from said receiving chamber to the cylinder chamber through which the tube extends, said valve being operative at a lower fluid pressure in the receiving chamber than the fluid flow restricting valve of the compound valve mechanism.

7. A shock absorber in accordance with claim 4, in which, however, the piston is provided with a valved fluid passage, independent of the fluid receiving chamber, and operative in response to movement of the piston away from the closed end of the cylinder, to establish a fluid flow from the cylinder working chamber through which the tube extends, into the other cylinder working chamber.

8. A shock absorber in accordance with claim 4, in which, however, the piston is provided with a valved fluid passage, independent of the fluid receiving chamber but including a portion of the port connecting said chamber with the cylinder chamber through which the tube extends, said valved fluid passage being operative to establish a fluid flow from the cylinder chamber containing the tube into the other cylinder chamber as the piston moves away from the closed end of the cylinder.

9. A shock absorber in accordance with claim 6, in which, however, the piston is provided with a valved passage, independent of the fluid receiving chamber, but operative to cooperate with a portion of the compound valve mechanism as the piston moves toward the bearing sleeve in the cylinder for directing fluid to the cylinder chamber adjacent the closed end of the cylinder, the said valved passage establishing a flow from the tube containing cylinder chamber, the compound valve mechanism from the tube.

10. A hydraulic shock absorber comprising a fluid containing cylinder closed at one end and having a bearing sleeve at its other end; a tube slidably extending through said sleeve into the cylinder; a piston in the cylinder dividing it into two working chambers, said piston having a recess in its one end for receiving the one end of the tube to which it is attached; a cage in the tube, cooperating with the piston to form a fluid receiving chamber therein, said chamber having a plurality of separate ports, one communicating with the tube, the other two each communicating with a working chamber respectively; and valve mechanisms normally closing the ports communicating with the tube and with the one cylinder chamber, the port communicating with the other cylinder chamber being constantly open, the valve mechanism controlling the port to said one cylinder chamber being operative to open its port in response to a lower fluid pressure than the valve controlling the port to the tube as the piston is moved toward the closed end of the cylinder.

MEARICK FUNKHOUSER.

REFERENCES CITED

The following references are of record in the file of this patent:

UNITED STATES PATENTS

| Number | Name | Date |
| --- | --- | --- |
| 2,183,003 | Becker | Dec. 12, 1939 |